3,332,750
PROCESS FOR THE PREPARATION OF NUCLEAR FUEL CARBIDES

Pierre Beucherie, Biandrono, Varese, Italy, Maurice Payrissat, Toulouse, France, and Joseph Gerard Wurm, Varese, Italy, assignors to European Atomic Energy Community—Euratom, Brussels, Belgium
No Drawing. Filed July 2, 1965, Ser. No. 469,314
Claims priority, application Belgium, Sept. 1, 1964, 652,565
4 Claims. (Cl. 23—344)

This invention relates to a process for the preparation of nuclear reactor fuel carbides, for example uranium carbide, wherein a nuclear fuel halide is reacted with carbon and a reducing metal, or with a carbide of such a metal.

It is known, for example, to prepare uranium carbide by calciothermy or magnesiathermy of uranium tetrafluoride in the presence of carbon. In such reactions the uranium carbide obtained is in powder form and is still very impure and highly pyrophoric. The impurities, i.e. $CaF_2$ or $MgF_2$, are still substantially non-volatile, and can be separated from the uranium carbide solely at high temperature in vacuo.

It has now been found that better results can be obtained if aluminum is used as the reducing metal. In the case of uranium tetrafluoride the following reactions can be produced:

(1)  $3UF_4 + Al_4C_3 \rightarrow 3UC + 4AlF_3$
(2)  $3UF_4 + 4Al + 3C \rightarrow 3UC + 4AlF_3$ These reactions give a uranium carbide with a carbon content very close to the theoretical content of 4.8%, while the aluminum fluoride obtained can readily be separated.

Although the invention will be explained hereinafter with reference to reaction (2), the invention is of course not limited to the preparation of uranium carbide, since similar reactions are possible for the preparation of other nuclear fuel carbides, such as plutonium carbide or thorium carbide, and with other nuclear fuel halides as starting material, e.g. uranium tetrachloride and uranium trichloride.

The process according to the invention preferably makes use of a starting reaction mixture which contains uranium tetrafluoride and graphite in stoichiometric proportions and an excess of 30–40% by weight of aluminum. This excess of aluminum, which during and after the reaction disappears as a result of vaporisation of the aluminum as such or as a halide, results in a uranium carbide with a better structure than when aluminum is present in the stoichiometric quantity.

The mixture of the starting materials for the reaction is prepared in a glove box and an inert gas atmosphere. An intimate mixing of the constituents is required to give a homogeneous carbide. The fact that uranium tetrafluoride is non-hygroscopic enabless the starting material to be treated satisfactorily. There is no fear of oxidation to hydroxy fluoride, and there is no uranium oxide in the resultant product.

Good results are obtained by pre-pressing the pulverulent starting materials into the form of tablets. The carbide obtained in these circumstances is not a pyrophoric powder but has the form of sintered tablets with good mechanical properties which can be treated without any special precautions in further processes, e.g. sintering or fusion by electron bombardment, high-frequency melting or electric arc melting. The tablets are made in a glove box with a vacuum press (15 ton per cm.²) to give a well-agglomerated starting material. It is preferable to use a binding agent to facilitate tabletting. A 5% solution of camphor in methanol has proved suitable for this purpose.

The tablets are then placed in a graphite reaction crucible and are first degasified in vacuo to remove the binder. Heating is carried out in an atmosphere of purified argon during the reaction and later in vacuo during the elimination of the resultant aluminum trifluoride and the excess aluminum. It is preferably to carry out the heating in a vacuum oven, by means of high-frequency current through the agency of a field concentrator surrounding the graphite crucible. A particularly suitable oven is described in U.S. application No. 382,500, of June 14, 1964, now Patent No. 3,296,355, in the name of the same applicants. The reaction takes place mainly at 1200–1250° C. and takes 3–4 hours. It has been found that the reaction takes place in three stages. The first stage begins at a low temperature (600° C.) at which $UF_3$ is formed, and in the second stage this substance separates at a higher temperature to uranium and uranium tetrafluoride (dismutation). The free uranium reacts with carbon to form the required carbide. Elimination of the aluminum fluoride crust and surplus aluminum begins at 1300° C. and continues to 1600° C. in vacuo. An elevated temperature towards the end of the reaction also promotes intensive agglomeration of the grains and a sintering process of the resultant uranium carbide. Contrary to expectations, the uranium carbide obtained has a sufficient mechanical strength to be worked and it does not ignite spontaneously in air. The carbide obtained can be conveniently worked by sintering and melting by electron bombardment in an electric arc or by high-frequency heating.

The reaction according to the invention gives a uranium carbide having the following composition:

| | |
|---|---|
| Total uranium content _____percent__ | 95–95.2 |
| Total carbon content _____do____ | 4.78–4.87 |
| Free carbon content _____do____ | 0.002–0.004 |
| Oxygen content, approx. _____p.p.m__ | 300 |
| Nitrogen, approx. _____p.p.m__ | 200 |
| Average aluminum, approx. _____p.p.m__ | 300 |

The carbide obtained by carbothermic reduction of nuclear fuel halides with aluminum in the presence of carbon according to the invention have the advantage of very low oxygen, nitrogen and free carbon contents as compared with carbides obtained by a reduction of the oxides. Also, the process according to the invention requires fewer reaction steps than if, for example, the carbide has to be prepared from the oxide. The process according to the invention can be used very satisfactorily for the preparation of enriched uranium carbide, since the conventional enrichment processes give uranium hexafluoride which can readily be converted to the tetrafluoride.

As compared with the use of calcium or magnesium, the use of aluminum as a reducing metal has the advantage that the aluminum-halide obtained is more volatile than the corresponding calcium or magnesium halides. Also, aluminum is cheaper than the said two metals while it is readily purified, put into powder form and pressed.

We claim:
1. A process for the preparation of nuclear reactor fuel carbides comprising intimately mixing a nuclear reactor fuel halide with a reactant from the group consisting of (a) carbon and aluminum and (b) aluminum carbide, reacting the mixture for several hours in an inert atmosphere or in vacuo at a temperature of approximately 1200° C. to 1600° C. and recovering the thereby produced nuclear reactor fuel carbide.

2. A process for the preparation of nuclear fuel carbides as set forth in claim 1, in which the reaction mixture consists essentially of uranium tetrafluoride, carbon and aluminum.

3. A process according to claim 2, in which the reaction mixture consists essentially of uranium tetrafluoride and graphite, in stoichiometric proportions, and aluminum in excess of 30–40% by weight of the stoichiometric quantity.

4. A process according to claim 2, in which the reaction is carried out in an argon atmosphere at a temperature of at least 1200° C. followed by heating in vacuo at a temperature of approximately 1300° C.–1600° C. to remove volatile reaction products from the resulting uranium carbide.

References Cited

UNITED STATES PATENTS 3,046,090  7/1962  Powers _____ 23—349

CARL D. QUARFORTH, *Primary Examiner.*

L. DEWAYNE RUTLEDGE, *Examiner.*

S. TRAUB, R. L. GRUDZIECKI, *Assistant Examiners.*